(12) United States Patent
Fellars

(10) Patent No.: US 10,472,775 B2
(45) Date of Patent: Nov. 12, 2019

(54) ARTIFICIAL TURF EDGING SYSTEM AND METHOD

(71) Applicant: Christopher John Fellars, Vista, CA (US)

(72) Inventor: Christopher John Fellars, Vista, CA (US)

( * ) Notice: Subject to any disclaimer, the term of this patent is extended or adjusted under 35 U.S.C. 154(b) by 0 days.

(21) Appl. No.: 16/350,873

(22) Filed: Jan. 28, 2019

(65) Prior Publication Data

US 2019/0169803 A1    Jun. 6, 2019

Related U.S. Application Data

(63) Continuation-in-part of application No. 15/732,056, filed on Sep. 7, 2017, now Pat. No. 10,227,736, which is a continuation of application No. 13/998,613, filed on Nov. 15, 2013, now Pat. No. 9,790,647.

(51) Int. Cl.
*E01C 13/08* (2006.01)
*E01C 13/02* (2006.01)

(52) U.S. Cl.
CPC .............. *E01C 13/08* (2013.01); *E01C 13/02* (2013.01)

(58) Field of Classification Search
CPC .............. E01C 13/08; E01C 2013/086; D10B 2505/202
See application file for complete search history.

(56) References Cited

U.S. PATENT DOCUMENTS

| | | | | | |
|---|---|---|---|---|---|
| 3,407,714 | A | * | 10/1968 | Henderson | E01C 13/08 428/17 |
| 3,433,137 | A | * | 3/1969 | Henderson | E01C 13/08 16/16 |
| 3,880,432 | A | * | 4/1975 | Coffey | A63B 69/3661 473/278 |
| 4,067,757 | A | * | 1/1978 | Layman | E01C 13/08 156/216 |
| 4,381,622 | A | * | 5/1983 | Spidell | A01G 9/28 47/33 |
| 4,489,115 | A | * | 12/1984 | Layman | E01C 13/08 156/258 |
| 4,727,697 | A | * | 3/1988 | Vaux | E01C 5/18 404/35 |
| 4,902,540 | A | * | 2/1990 | Martino | A63B 69/3661 427/389.9 |

(Continued)

*Primary Examiner* — Benjamin F Fiorello

(57) ABSTRACT

A method and system for providing an artificial turf edge. In one embodiment, the method includes: providing a first layer of base material along a perimeter of the artificial turf area; placing at least one raised border piece on top of the first layer of base material and thereafter securing the at least one raised border piece to the first layer of base material, wherein the at least one raised border piece includes a main wall that extends upwardly and at a predetermined angle away from an external surface adjacent to the artificial turf area; providing a second layer of base material over at least a portion of the first layer of base material, wherein the second layer of base material is confined by the at least one raised border; placing an artificial turf material over the second layer of base material and over the main wall; and securing the artificial turf material to the second layer of base material and the at least one raised border piece, wherein a level of the second layer of base material confined by the at least one raised border piece is higher than a level of the external surface.

15 Claims, 19 Drawing Sheets

(56) References Cited

U.S. PATENT DOCUMENTS

| | | | | |
|---|---|---|---|---|
| 5,309,846 A * | 5/1994 | Peterson | E01C 13/083 |
| | | | 108/53.3 |
| 5,467,977 A * | 11/1995 | Beck | A63B 69/0013 |
| | | | 473/497 |
| 5,647,692 A * | 7/1997 | Gunter | E01C 11/227 |
| | | | 404/2 |
| 5,848,940 A * | 12/1998 | Yamada | A63B 67/02 |
| | | | 473/157 |
| 6,139,443 A * | 10/2000 | Reynolds | A63B 69/3661 |
| | | | 273/DIG. 8 |
| 6,616,542 B1 * | 9/2003 | Reddick | A63B 69/3661 |
| | | | 428/17 |
| 6,764,411 B2 * | 7/2004 | Knox | A63B 67/02 |
| | | | 473/162 |
| 6,857,243 B2 * | 2/2005 | Bloomfield | E04C 2/043 |
| | | | 156/304.3 |
| 7,090,586 B1 * | 8/2006 | Everett | A63C 19/00 |
| | | | 404/99 |
| 7,147,401 B2 * | 12/2006 | Wickens | E01C 13/08 |
| | | | 405/45 |
| 7,189,445 B2 * | 3/2007 | Knox | E01C 13/08 |
| | | | 428/17 |
| 7,273,642 B2 * | 9/2007 | Prevost | A63C 19/04 |
| | | | 428/17 |
| 7,736,241 B2 * | 6/2010 | Lancia | A63B 67/02 |
| | | | 428/17 |
| 7,740,420 B2 * | 6/2010 | Jones | E02D 29/0225 |
| | | | 405/15 |
| 8,029,376 B2 * | 10/2011 | Shaneour | E01C 13/08 |
| | | | 405/49 |
| 2012/0230777 A1 * | 9/2012 | Ayers | E02D 17/20 |
| | | | 405/302.7 |
| 2012/0276342 A1 * | 11/2012 | Bray | E01C 13/08 |
| | | | 428/174 |
| 2013/0022763 A1 * | 1/2013 | McSwain | E01C 13/08 |
| | | | 428/17 |
| 2014/0287169 A1 * | 9/2014 | Guentner | B29C 45/14467 |
| | | | 428/17 |

* cited by examiner

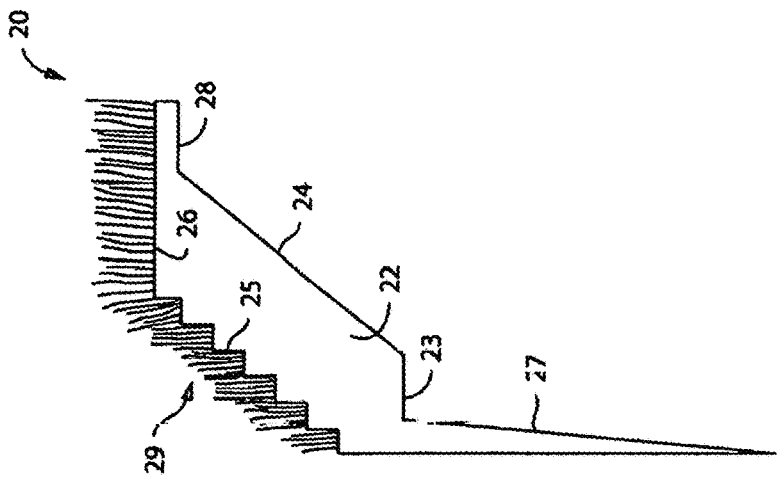
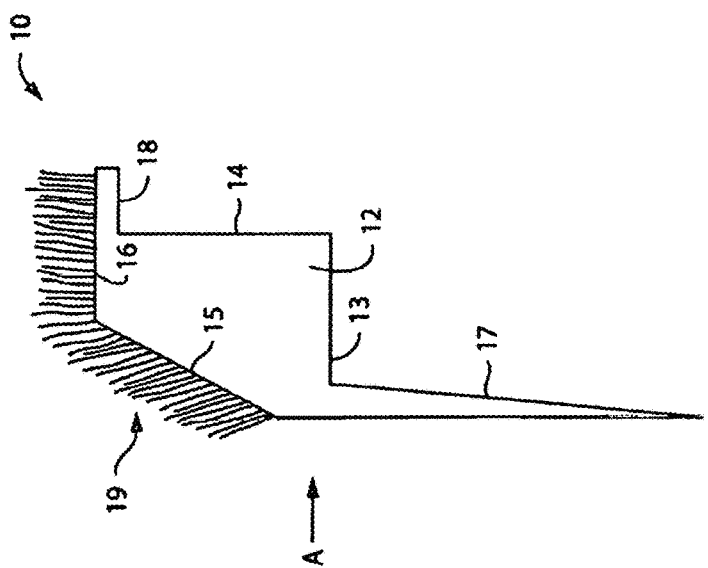

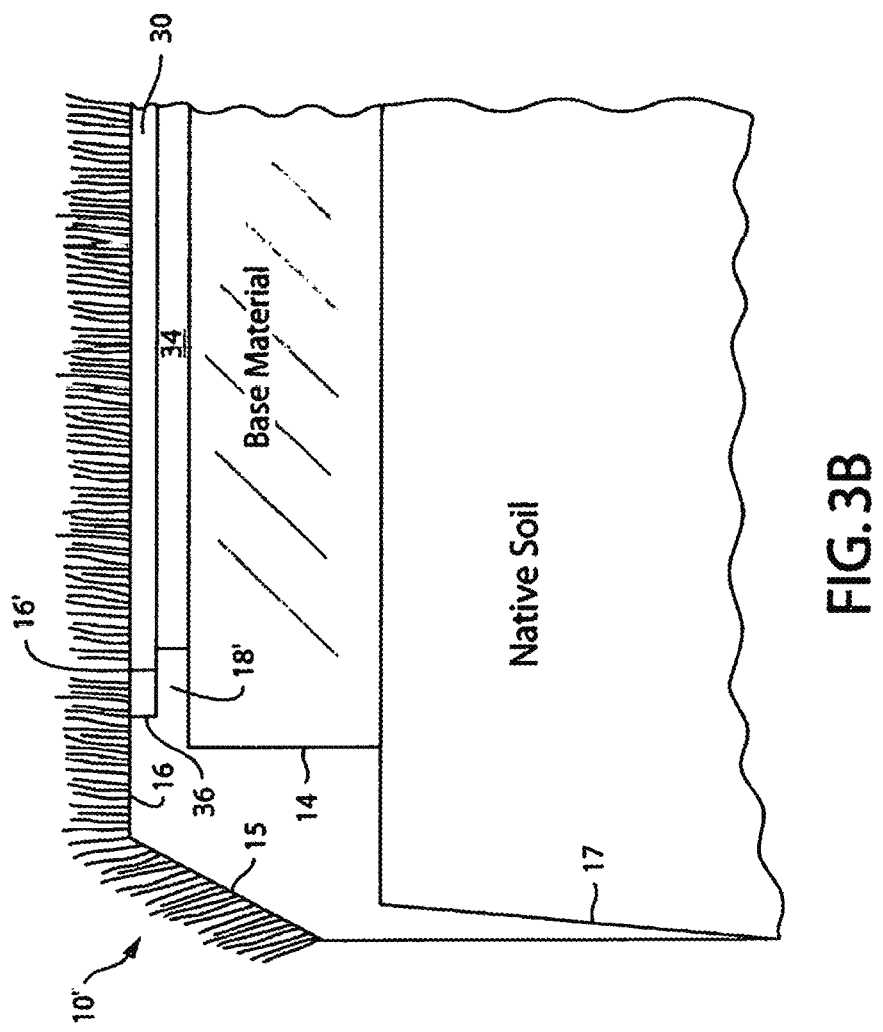

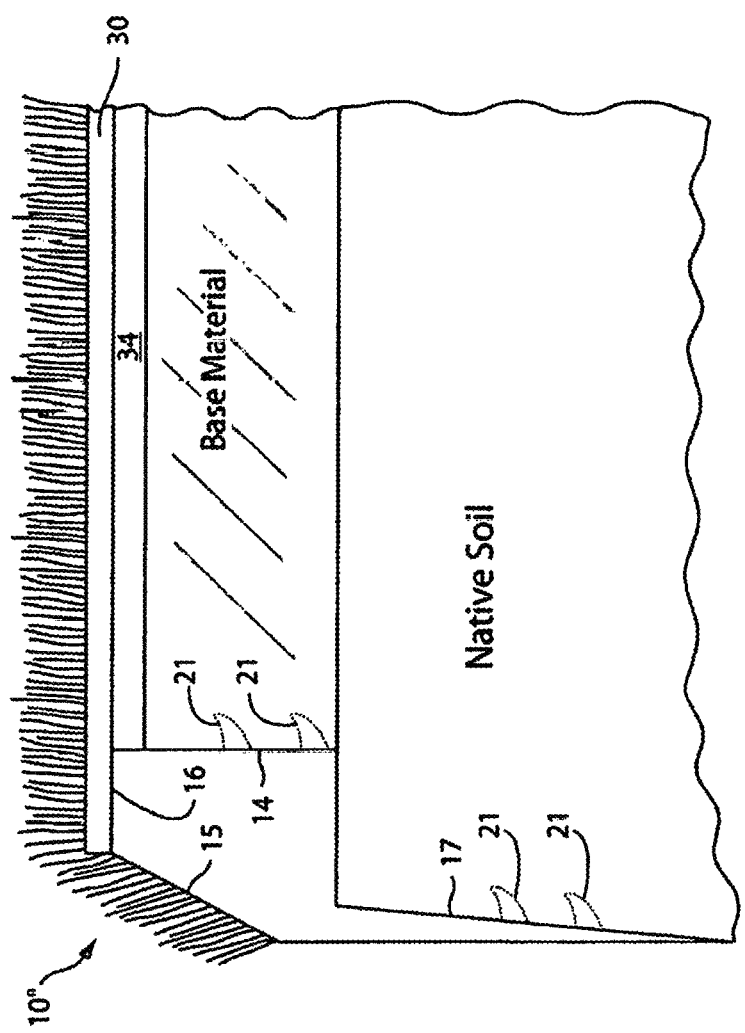

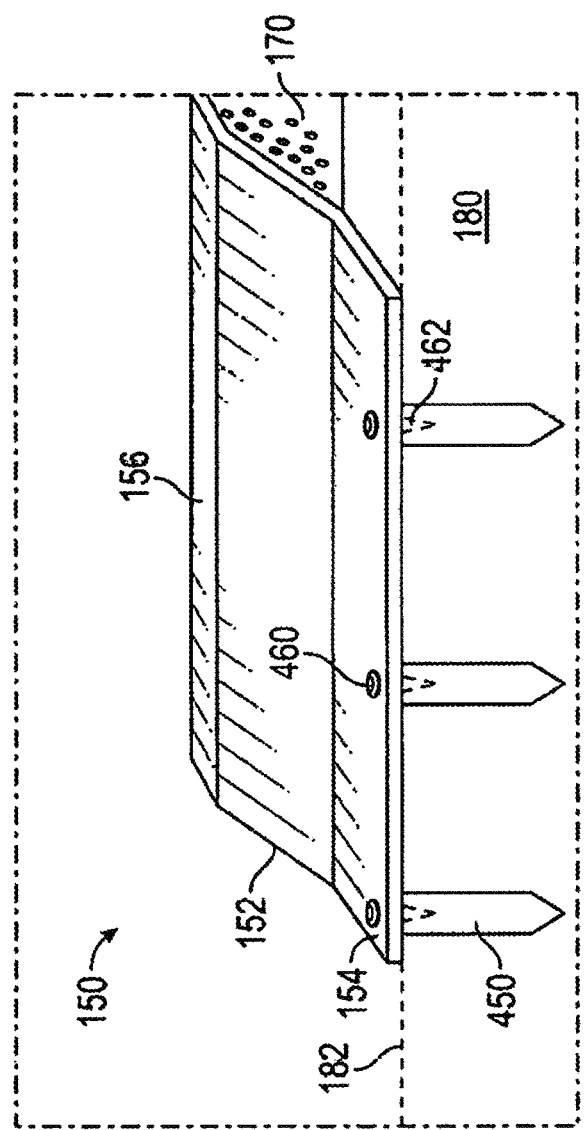

ARTIFICIAL TURF EDGING SYSTEM AND METHOD

RELATED APPLICATIONS

The present application is a continuation-in-part of U.S. application Ser. No. 15/732,056 filed on Sep. 7, 2017, which is a continuation of U.S. application Ser. No. 13/998,613 filed on Nov. 15, 2013 (now U.S. Pat. No. 9,790,647), both entitled "Artificial Turf Edging System and Method," the contents of which are each incorporated herein in their entireties.

FIELD OF THE INVENTION

The present invention relates generally to artificial turf, and more particularly to an edging system and method for installing an artificial turf edge that improves the appearance of artificial turf after installation and reduces the amount of labor necessary to install artificial turf.

BACKGROUND OF THE INVENTION

Due to the increasing costs of water in most states, more consumers are choosing to install artificial turf in their residences and businesses than ever before. Although the quality and appearance of artificial turf has improved over the past several decades, the appearance of artificial turf still suffers from some drawbacks. One of clearest tell-tale signs that allows consumers to readily distinguish artificial turf from real turf is the lack of a raised and cut edge on the artificial turf. This is especially apparent when the artificial turf is installed adjacent another flat surface such as concrete or decking, for example. The blades of the artificial turf extend upwardly from a synthetic backing which is typically flush or near flush with the level of the adjacent surface. This gives the artificial turf a fake "carpet-like" appearance as opposed to a natural look that simulates the appearance of a real-grass lawn.

In contrast, real grass lawns which are mowed and edged almost always have a raised edge that typically rises two to four inches above an adjacent flat surface (e.g., concrete, decking, etc.). The raised edge comprises blades of grass that have been cut to create the lawn edge. This natural appearance of real-grass lawns is not emulated in conventional artificial turf installations.

Additionally, the installation process for artificial turf is cumbersome. Before artificial turf is laid down over a predetermined surface area, workers must typically excavate the surface area to a desired depth (e.g., three to four inches) to allow space for a correspondingly thick layer of base material (typically, a fine rock or gravel material) to be poured under the artificial turf to support the turf as the foundation and drainage bed during heavy rains. An optional weed barrier is then placed over the base material, followed by the artificial turf, which is placed on the top of the weed barrier or directly on top of the base material. Depending on the size of the surface area, such excavation may incur significant labor costs. Additionally, the excavated dirt and/or soil typically needs to be removed from the premises, which incur additional fees for removal and dumping of the dirt and/or soil.

In view of the above deficiencies of conventional artificial turf systems, there is a need for an artificial turf edging system that provides a more realistic appearance to artificial turf after it is installed, and reduces costs associated with the installation of conventional artificial turf systems.

SUMMARY OF THE INVENTION

The invention addresses the above needs by providing an artificial turf edging system and method that gives the appearance of a raised, cut edge of a real-grass lawn. The artificial turf edging system and method further allows for significant reductions in installation costs by eliminating or substantially reducing the amount of labor required to excavate dirt or soil from an installation area, as well as eliminating or reducing the costs associated with transport and dumping of the excavated dirt or soil.

In one embodiment, the invention provides an artificial turf edging method that includes: providing at least one layer of base material within the artificial turf area; securing at least one raised border piece to the at least one layer of base material, wherein the at least one raised border piece includes a main wall that extends upwardly and away from an external top surface adjacent to the artificial turf area at a first predetermined angle; placing an artificial turf material over the at least one layer of base material and over the main surface of the at least one raised border piece; and securing the artificial turf material to the at least one layer of base material and the at least one raised border piece, wherein the artificial turf material comprises a plurality of artificial turf blades that extend outwardly and away from the main wall, and wherein a level of the at least one layer of base material confined behind the at least one raised border piece is higher than the external top surface.

In a further embodiment, the invention provides an artificial turf edging method that includes: providing a first layer of base material along a perimeter of the artificial turf area; placing at least one raised border piece on top of the first layer of base material and thereafter securing the at least one raised border piece to the first layer of base material, wherein the at least one raised border piece includes a main wall that extends upwardly and at a predetermined angle away from an external surface adjacent to the artificial turf area; providing a second layer of base material over at least a portion of the first layer of base material, wherein the second layer of base material is confined by the at least one raised border; placing an artificial turf material over the second layer of base material and over the main wall; and securing the artificial turf material to the second layer of base material and the at least one raised border, wherein a level of the second layer of base material confined by the at least one raised border piece is higher than a level of the external surface.

In another embodiment, a raised artificial turf edge system includes a first raised border piece. The first raised border piece includes: a first main wall; a first bottom flange extending outwardly from a bottom portion of the first main wall at a first predetermined angle; and a first top flange extending outwardly from a top portion of the first main wall at a second predetermined angle, wherein the first and second predetermined angles are each in the range of 120 to 155 degrees.

BRIEF DESCRIPTION OF THE DRAWINGS

The present disclosure, in accordance with one or more embodiments, is described in detail with reference to the following figures. The drawings are provided for purposes of illustration only and merely depict typical or exemplary embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

FIG. 1 illustrates a cross-sectional side view of an edging system 10 in accordance with one embodiment of the invention.

FIG. 2 illustrates a cross sectional side view of an edging system 20 in accordance with another embodiment of the invention.

FIGS. 3A-3C illustrates cross-section side views one exemplary application of the edging system of FIG. 1.

FIG. 14 illustrates a perspective, cross-sectional view of a raised border piece secured to a plurality of stakes driven into native soil, in accordance with some embodiments.

DETAILED DESCRIPTION OF THE EXEMPLARY EMBODIMENTS

Figure 3A:
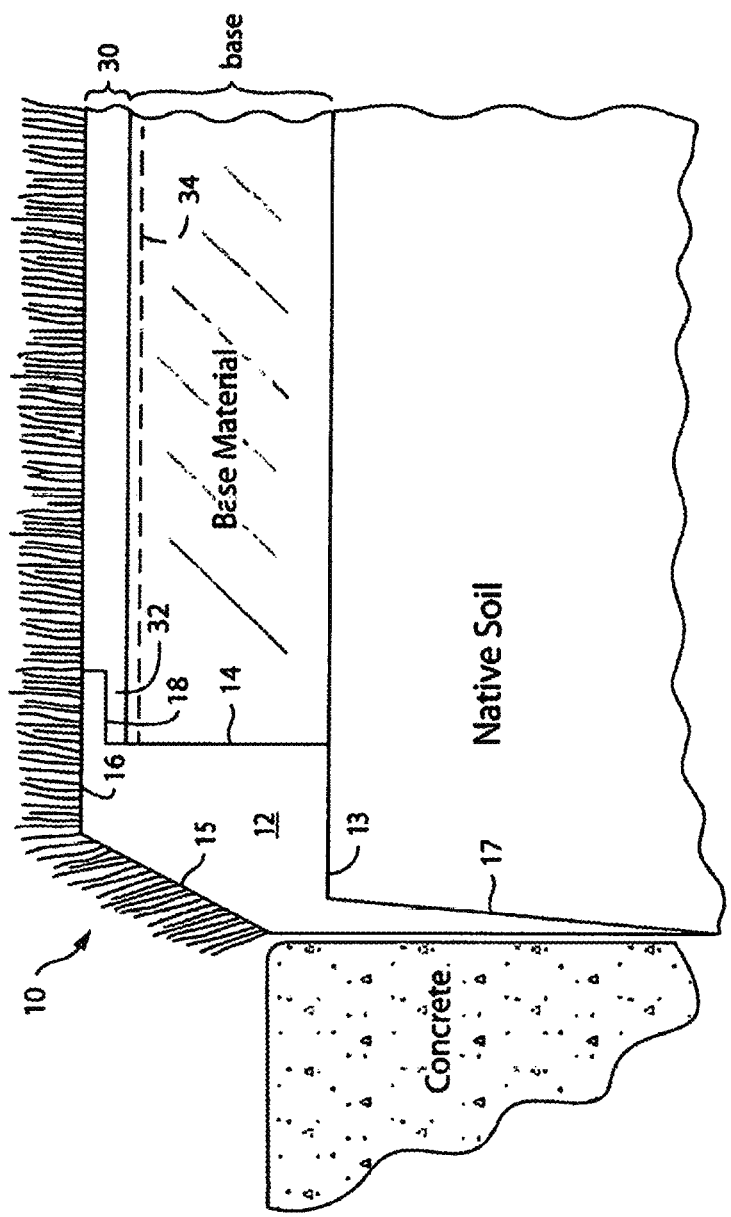

Various embodiments of the present invention are described in detail below with reference to the figures.

FIG. 1 illustrates a cross-sectional side view of an edging system 10 in accordance with one embodiment of the invention. The edging system includes a main body portion 12 having a bottom surface 13 and an interior side surface 14. The main body 12 also includes an inclined exterior side surface 15 and a top surface 16. Extending downwardly from the bottom surface 13 is an anchoring portion 17 configured to be driven downwardly into dirt or soil. Extending outwardly in a lateral direction from the interior side surface 14 is a lip or flange portion 18. A plurality of artificial turf blades 19 are sewn, glued or attached by any suitable means to the inclined exterior side surface 15 and optionally the top surface 16 to provide the appearance of grass growing from these surfaces.

FIG. 2 shows a cross sectional side view of an edging system 20 in accordance with another embodiment of the invention. In this embodiment, the inclined exterior side surface 15 of FIG. 1 is replaced with a step-tiered exterior side surface 25. Also, the interior side surface 14 of FIG. 1 is replaced with an inclined interior side surface 24 as shown in FIG. 2.

FIGS. 3A-3C illustrate three exemplary, alternative methods of coupling the edging system 10 to the backing 30 of artificial turf, in accordance with three exemplary, alternative embodiments of the invention.

FIG. 3A shows one exemplary application of the edging system 10 of FIG. 1. In one embodiment, the edging system 10 is designed to be inserted at the boundary between two surfaces such as concrete and dirt or soil. The anchoring portions 17 of the edging system 10 are pushed downwardly into the dirt as close as possible to where the dirt meets the concrete. In one embodiment, the anchoring portions 17 is tapered and has a leading edge designed to facilitate driving the anchoring portions 17 into the dirt until the bottom surface 13 meets a top surface of the dirt. In this way, the anchoring portions 17 anchor the edging system 10 into the dirt to provide a stable raised border between the concrete and dirt. The bottom surface 13 of the main body 12 is configured to rest on top of the dirt which thereby supports the main body 12. As discussed above a plurality of artificial turf blades are attached to the inclined exterior side surface 15 and optionally on the top surface 16 of the edging system 10 to provide the appearance of a groomed edge of a real lawn.

The lip 18 is configured to mate with a corresponding lip 32 of the backing 30 of artificial turf. Any type of mating configuration (e.g., tongue and groove) may be employed between the lip 18 and the artificial turf backing 30. In one embodiment, pre-drilled nail holes are provided at spaced locations on the lip 18 to allow easy fastening between the lip 18 and artificial turf backing 30. As would be appreciated by those of ordinary skill in the art after reading this specification, the lip 18 can be fastened to the backing 30 of the artificial turf in many different ways, such as gluing, stapling and/or nailing them together.

The interior side surface 14 provides an interior wall that will support and confine base material that is typically layered on top of the dirt prior to installation of the artificial turf. Base material is typically comprised of fine rock or gravel, however, any known base material or other suitable material may be used. An optional weed-barrier layer 34 may be placed on top of the base material before the artificial turf is installed on top thereof.

FIG. 3B illustrates a cross-sectional side view of an edging system 10' in accordance with another embodiment of the invention. The edging system 10' is similar to the edging system 10 of FIG. 3A, however, the flange 18' is formed by providing a step down 36 from the top surface 16 to provide a second top surface 16' configured to receive and be coupled with a bottom surface of the backing 30 of artificial turf. As would be apparent to one of ordinary skill in the art, the backing 30 can be securely coupled to the flange 18' using any one of various known securing techniques, such as nailing, gluing, stapling and/or snap-fit mechanisms as described in further detail below, in accordance with exemplary embodiments of the invention, and any combination of these techniques.

FIG. 3C illustrates a cross-sectional side view of an edging system 10" that is a simplified version of the edging system 10 of FIG. 1. The edging system 10" does not include the flange 18 of the edging system 10 and simply provides a top surface 16 without artificial turf blades so that the backing 30 may be placed on top of the surface 16. The backing 30 may be securely coupled to the top surface 16 using any one of the securing techniques discussed above with respect to FIG. 3B, for example. In an alternative embodiment, the top surface 16 may have one portion having artificial turf blades extending upwardly therefrom, and another portion with no artificial turf blades and configured to receive and be securely coupled with an edge of the backing 30. As further shown in FIG. 3C, in one embodiment, the edging system 10" may include one or more optional hooks or barbs 21 extending outwardly from the anchoring portion 17 or interior side surface 14 of the main body portion 12. The barbs 21 further help to secure the edging system 10" into the native soil and/or base material by resisting any upward pulling force applied to the edging system 10". Thus, the barbs 21 in conjunction with the anchoring portions 17 provide a more secure anchoring mechanism for the edging system 10". It is appreciated that in various embodiments, the number, size and specific locations of the barbs 21 may be changed to accommodate different applications or environmental factors.

By providing a raised barrier to confine the base material, the edging system of the present invention eliminates or reduces the amount of dirt or soil that must be excavated prior to pouring of the base material in the area of artificial turf installation. This saves labor costs and time, as well as dirt/soil removal costs and time. Thus, the present invention not only improves the appearance of artificial turf systems but can also decrease costs associated with their installation.

Furthermore, conventional artificial lawn materials used for landscaping purposes typically contain blades with a height of 1"-2.25" tall. When compared to a natural grass blade, a synthetic lawn blade is significantly shorter and often provides a fake or synthetic look to the lawn. This is especially noticeable where the lawn ends against a concrete border or any other type of border because the blades are very short compared to a natural grass lawn. The edging system of the present invention, in addition to providing an authentic looking edge of a real-grass lawn, also allows the height of the entire artificial turf surface to be raised in comparison to an adjacent concrete surface, for example. This raised height more accurately emulates the length and height of real grass and provides a much thicker/fuller appearance to the entire synthetic lawn system. Thus, another advantage provided by the invention is that it allows the use of conventional, shorter artificial turf blades while providing the appearance that the blades are much taller because the edging system exposes the profile or edge of the synthetic lawn and provides a more vertical growth appearance. This saves significant material costs when compared to implementing an artificial turf systems having longer artificial blades to emulate the longer blades of real grass.

Figure 4:
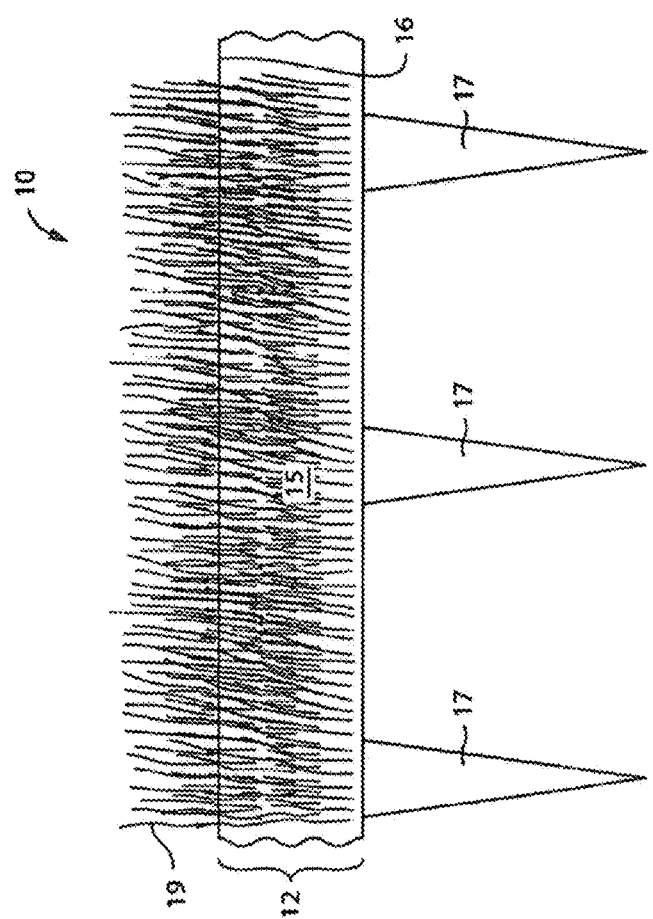
FIG. 4 illustrate a front view of the edging system 10 when viewed in the direction indicated by arrow A in FIG. 1.

FIG. 4 illustrate a partial front view of the edging system 10 when viewed in the direction indicated by arrow A in FIG. 1. As shown in FIG. 4, a plurality of anchoring portions 17, configured as spikes in this embodiment, are spaced from one another by a predetermined distance and extend downwardly from the main body 12 of the edging system 10. The spikes 17 provide a secure anchoring mechanism for the edging system 10 while allowing the edging system to remain flexible and bend at the portions where there are no spikes 17 extending downwardly. This allows the edging system 10 to be contoured to provide a peripheral border of surface areas having non-linear borders. It is understood, however, that the anchoring portions 17 need not be configured as discrete spikes but, rather, as a continuous leading edge that can be driven into the ground, in accordance with alternative embodiments. Such continuous anchoring portions 17 can be manufactured from various synthetic materials in various dimensions to provide a desired rigidity and flexibility appropriate for a given application.

A plurality of artificial turf blades 19 extend outwardly from inclined exterior side surface 15 and top surface 16 to provide the appearance of a raised, cut edge of a real lawn, thereby improving the aesthetic appearance of the artificial turf edge, as well as overall surface area as discussed above.

Figure 5:
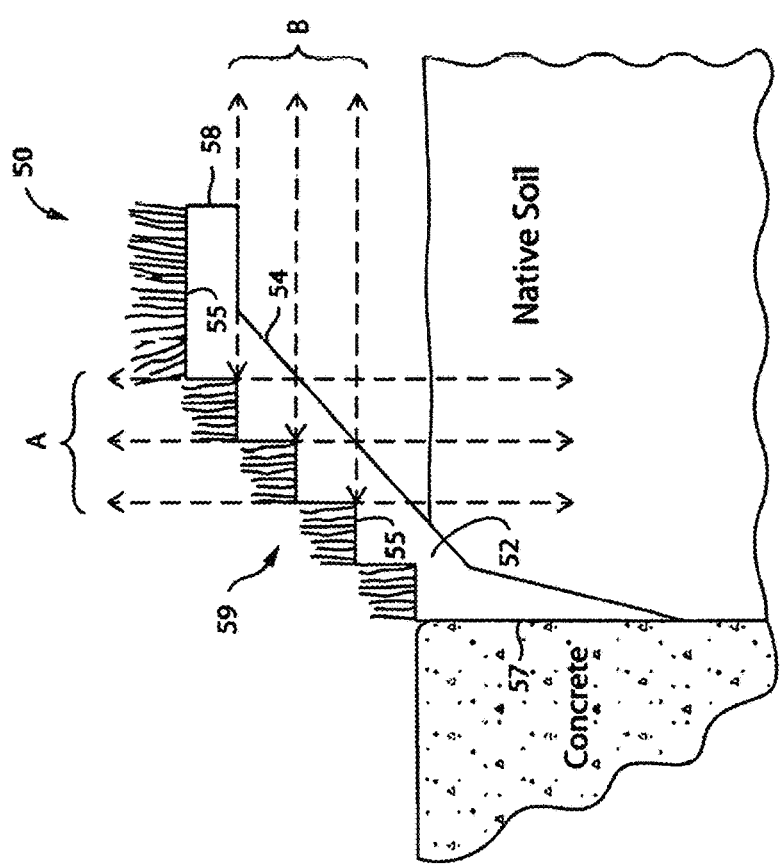
FIG. 5 illustrates a cross-sectional side view of an edging system that is adjustable in height, in accordance with one embodiment of the invention.

FIG. 5 illustrates a cross-sectional side view of an artificial turf edging system 50 that is adjustable in height, in accordance with one embodiment of the invention. The edging system 50 is similar in configuration to the edging system 20 of FIG. 2, however, the body 52 of edging system 50 is thinner than the body 22 of edging system 20. The thinner body 52 allows for the edging system 50 to be selectively cut along one of the cut lines A indicated by vertical dashed lines in FIG. 5. By cutting off portions of the tiered inclined surfaces, the height of the edging system may be readily adjusted to a consumer's preference. Corresponding to each vertical cut line A, a finished height B of the edging system 50 is represented by horizontal dashed lines in FIG. 5. Therefore, the edging system 50 is customizable to meet the desired specifications of each individual.

Figure 6:
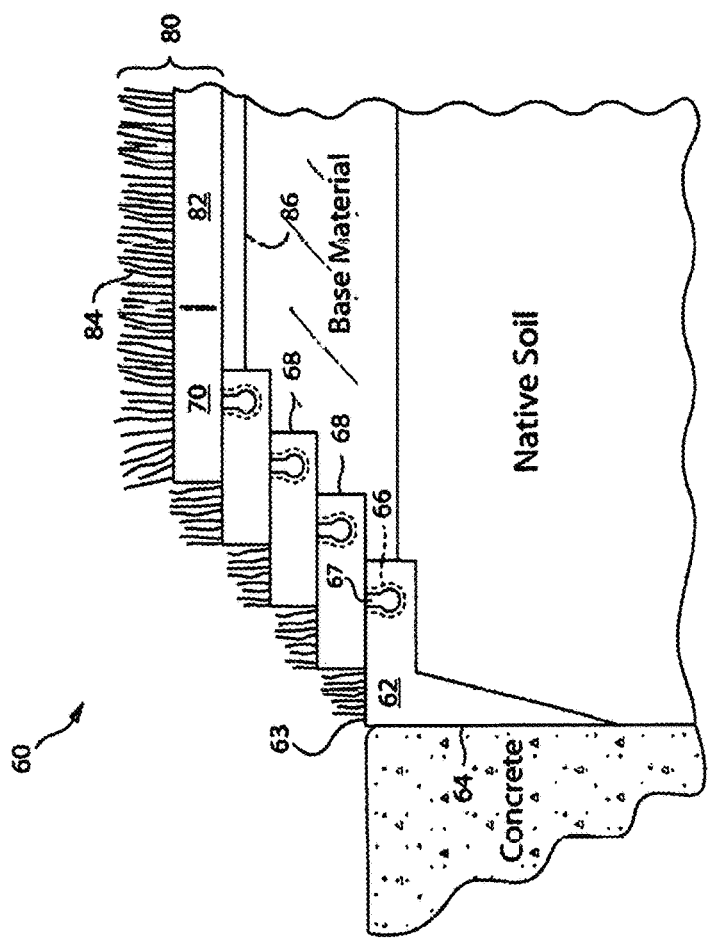
FIG. 6 illustrates a cross-sectional side view of a modular edging system that is adjustable in height, in accordance with one embodiment of the invention.

FIG. 6 illustrates a cross-sectional side view of a modular artificial turf edging system 60, in accordance with one embodiment of the invention. The system 60 includes a main base portion 62 having an anchoring portion 64 extending downwardly therefrom. The anchoring portion 64 may have a similar configuration and function as the anchoring portion 17 of FIG. 1 discussed above. The system further includes a plurality of modular intermediate edge portions 68 and a modular top edge portion 70. As shown in FIG. 6, each of the intermediate edge portions 68 and the top edge portion 70 are configured to be stacked on top of a portion of a top surface 63 of the base portion 62, which does not have any artificial turf blades extended outwardly therefrom. The remaining portion of the top surface 63, where the modular portions 68 and 70 are not stacked, includes artificial turf blades extending upwardly therefrom to provide an appearance of a raised and cut edge of a real lawn.

Similar to the base portion 62, each intermediate modular portion 68 has a top surface only partially covered with artificial turf blades, where the uncovered surface is configured to receive and support another modular portion 68 or 70 stacked thereon. In contrast, the modular top portion 70 has a top surface that is completely covered with artificial turf blades (i.e., has artificial blades interspersed and extending upwardly from the entire top surface).

As shown in FIG. 6, the base portion 62 includes a snap-fit receptacle 66 configured to receive and hold a snap-fit protrusion 67 extending downwardly from a modular intermediate portion 68 or the modular top portion 70. By adding or removing one or more intermediate edging portions 68, the edging system 60 provides a customizable edging system 60 that can be easily assembled or disassembled to provide a desired edging height. The height of the edging system above the native soil as shown in FIG. 6 provides a containment barrier and internal space for the base material that is necessary to support the artificial turf lawn. An optional weed barrier 86 can be installed over the base material. The artificial turf 80, comprising a synthetic backing 82 and a plurality of artificial blades 84 extending upwardly from the backing 82, is placed over the optional weed barrier 86 and base material. The synthetic backing 82 of the artificial turf 80 may then be fastened to the modular top portion 70 or an intermediate portion 68 in any desired fashion, as discussed above with respect to the synthetic backing 30 of FIGS. 3A-3C, above.

In an alternative embodiment, the modular top portion 70 may be omitted and the synthetic backing 82 is securely coupled to a top surface of a modular intermediate portion 68 instead. Additionally, the modular top portion 70 may further be configured to have a flange 18 or 18', as shown in FIGS. 3A and 3B, for example, extending outwardly therefrom to securely couple the top portion 70 to a backing 30/82 as discussed above. In another embodiment, the modular top portion 70 has at least a portion of its top surface without any artificial turf blades so that it can receive and be securely coupled to the backing 30/82 placed thereon using any of the securing techniques discussed above.

Figure 7A:
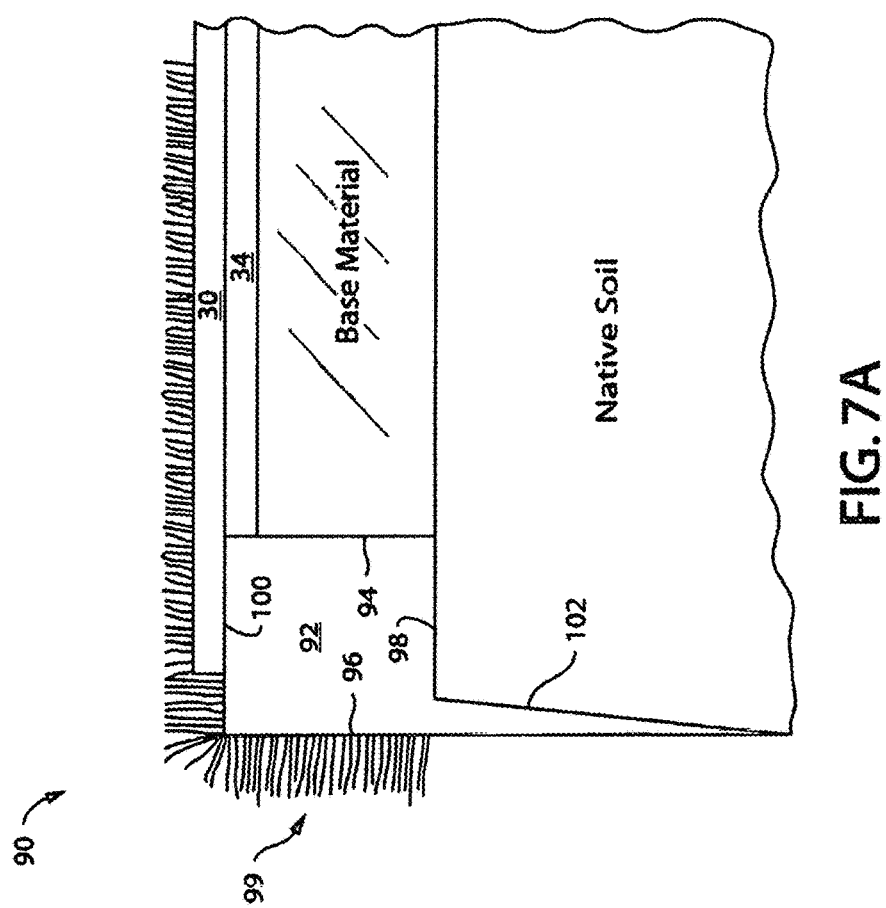
FIGS. 7A-7C illustrate cross-sectional side views of an artificial turf edging system in accordance with various embodiments of the invention.

FIG. 7A illustrates a cross-sectional side view of an alternative edging system 90 of the present invention. The edging system 90 includes a main body portion 92 having an interior side surface 94, an exterior side surface 96, a bottom surface 98 and top surface 100. A plurality of artificial turf blades 99 extend outwardly from the exterior side surface 96 to provide an appearance of a cut edge of a real lawn. An anchoring portion 102 extends downwardly from the bottom surface 98 and is configured to be inserted into a ground surface (e.g., dirt or soil) to anchor the edging system 90 to the ground surface. In addition to providing an aesthetically pleasing appearance of a cut edge of a real lawn, the edging system 90 further provides a raised barrier for containment of a base material for supporting artificial turf 30 placed thereon. Thus, the edging system 90 eliminates or substantially reduces the time, labor and cost associates with excavating and removing dirt/soil to make room for the base material. An optional weed barrier 34 may be installed between the base material and the artificial turf 30. As shown in FIG. 7A, the exterior side surface 96, depending on desired preferences and/or applications, can be substantially vertical and need not be inclined as discussed above with respect to previous embodiments. In alternative embodiment, depending on desire preferences and/or applications, the exterior side surface 96 can be configured to have a concave or convex curved shape, a reverse incline, or any other desired shape or contour depending the desired preferences and/or application.

Figure 7B:
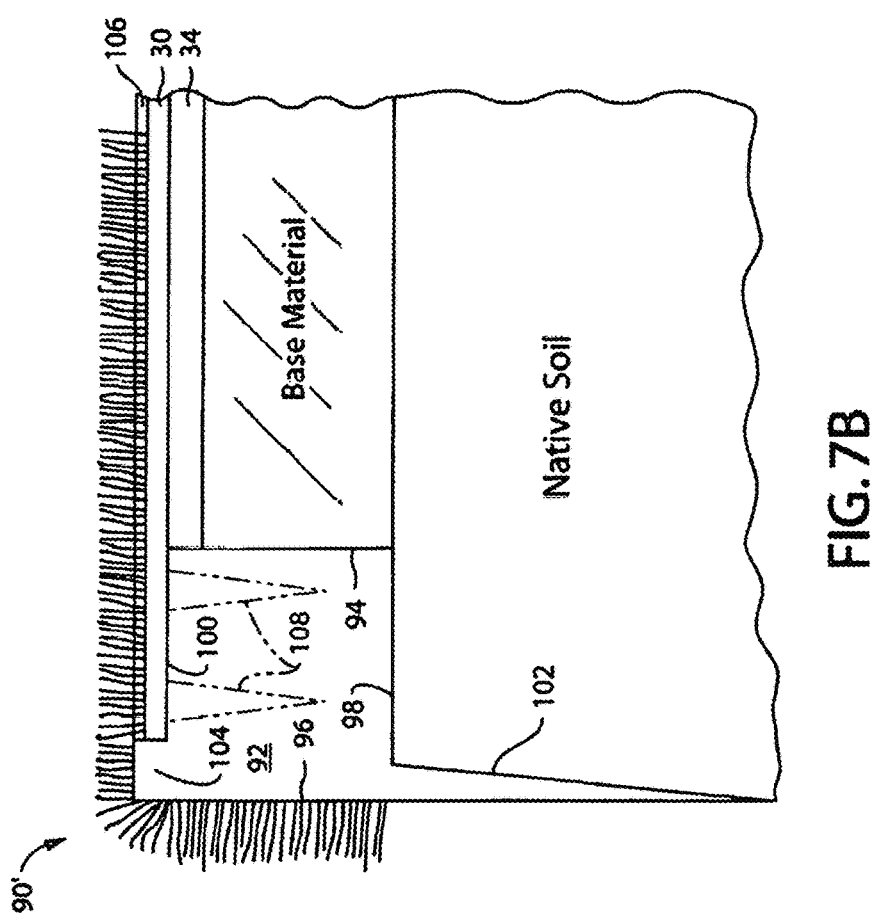

FIG. 7B illustrates a cross-sectional side view of an artificial turf edging system 90' in accordance with a further embodiment of the invention. This embodiment is similar to the embodiment shown in FIG. 7A but further includes a raised back-stop portion 104 extending upwardly from an edge portion of the surface 100. As shown in FIG. 7B, the back-stop portion 104 is configured to provide a stop for the backing 30 of artificial turf. In one embodiment, the height of the back-stop portion 104 is approximately one-quarter of an inch or taller and provides a back-stop not only for the backing 30 but also filler material 106 that may be placed on top of the backing 30. Various types of filler materials 106 are known in the art such as green sand, acrylic sand, silica sand, crumbled rubber, etc. Any conventional filler material known now or in the future may be used in various embodiments of the invention.

In one embodiment, the edging system may further include one or more pre-formed or pre-drilled securement holes 108 located at periodically spaced apart locations along the length of the main body portion 92. Each securement hole 108 configured to securely receive corresponding fastening members, such as nails, screws or other counterpart male fastening mechanism therein. In one embodiment, a nail (not shown) can be driven through the artificial turf backing 30 and readily received and secured with the securement hole 108 to firmly secure edge portions of the artificial turf backing 30 to the main body portion 92. Additionally, the nail may include one or more barbs, similar to the barbs 21 shown in FIG. 3C, to provide additional anchoring of the nail once embedded in securement holes 108. Alternatively, a screw (not shown) may be screwed or driven through the artificial turf backing 30 and thereafter securely received within corresponding pre-threaded screw holes 108 to firmly secure edge portions of the artificial turf backing 30 to the main body portion 92. It will be appreciated by those of ordinary skill in the art that the pre-drilled or pre-formed holes 108 will facilitate the process of securing the artificial turf backing 30 to the main body portion 92 while also preventing substantial cracking or possible undesired deformation of the main body portion 92 during insertion of nails, screws or other male fastener.

Figure 7C:
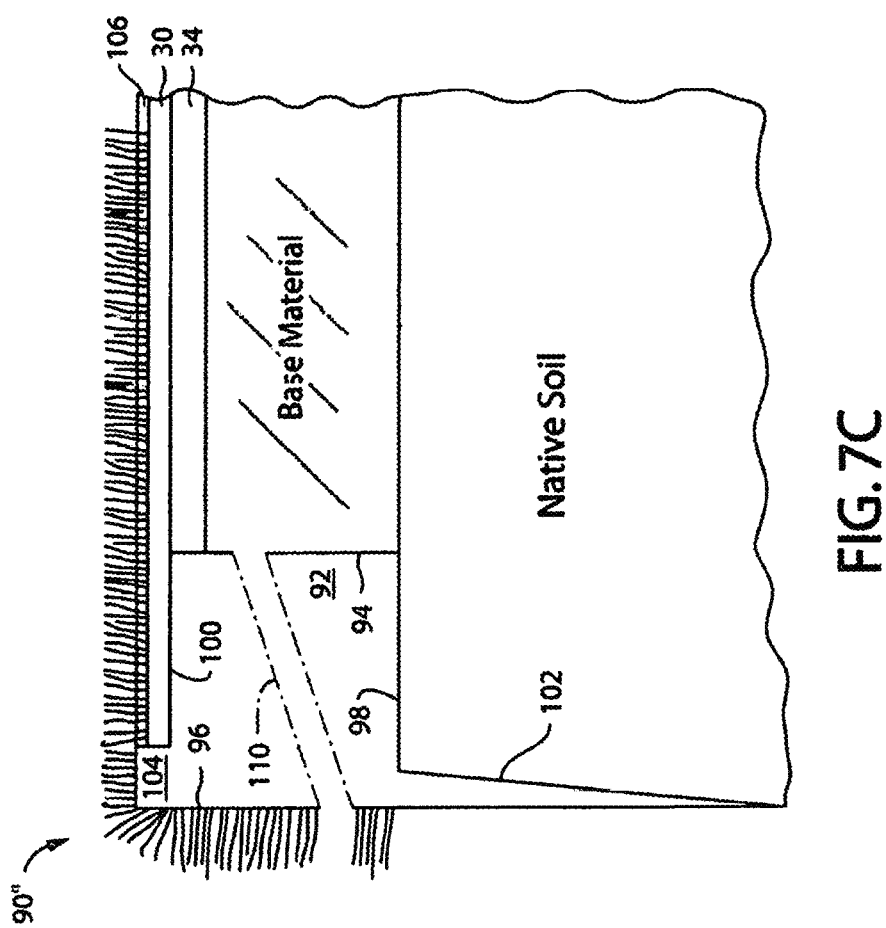

FIG. 7C illustrates a cross-sectional side view of an artificial turf edging system 90" in accordance with a yet another embodiment of the invention. The edging system 90" of FIG. 7C is substantially similar to the edging system 90' of FIG. 7B but further includes a lateral drainage hole 110 extending across the main body portion 92 in a downwardly inclined fashion from side surface 94 to side surface 96. A plurality of drainage holes 110 are located at periodically spaced apart locations along the length of the main body portion 92. When water drains downwardly from a top surface of the artificial turf backing 30 into the base material, the water is diverted by the drainage holes 110 from the area where the base material is located to outside of the edging system 90". In this way, the edging system 90" can prevent or substantially reduce undesirable accumulation and pooling of water under the artificial turf 30. Again, it should be understood that the drawings herein are not necessarily drawn to scale and the drainage holes 110 may be relatively larger or smaller than that illustrated in FIG. 7C. In an alternative embodiment, instead of using drainage holes 110, the main body portion 92 may be made from a porous material or other suitable material that allows water to pass through it without any additional holes or punctures in the main body portion 92.

As would be apparent to one of ordinary skill in the art, various combinations of the structural elements of FIGS. 1-7C can be mixed and matched, and alternative designs and structural modifications can be implemented in accordance with the present invention.

Figure 8:
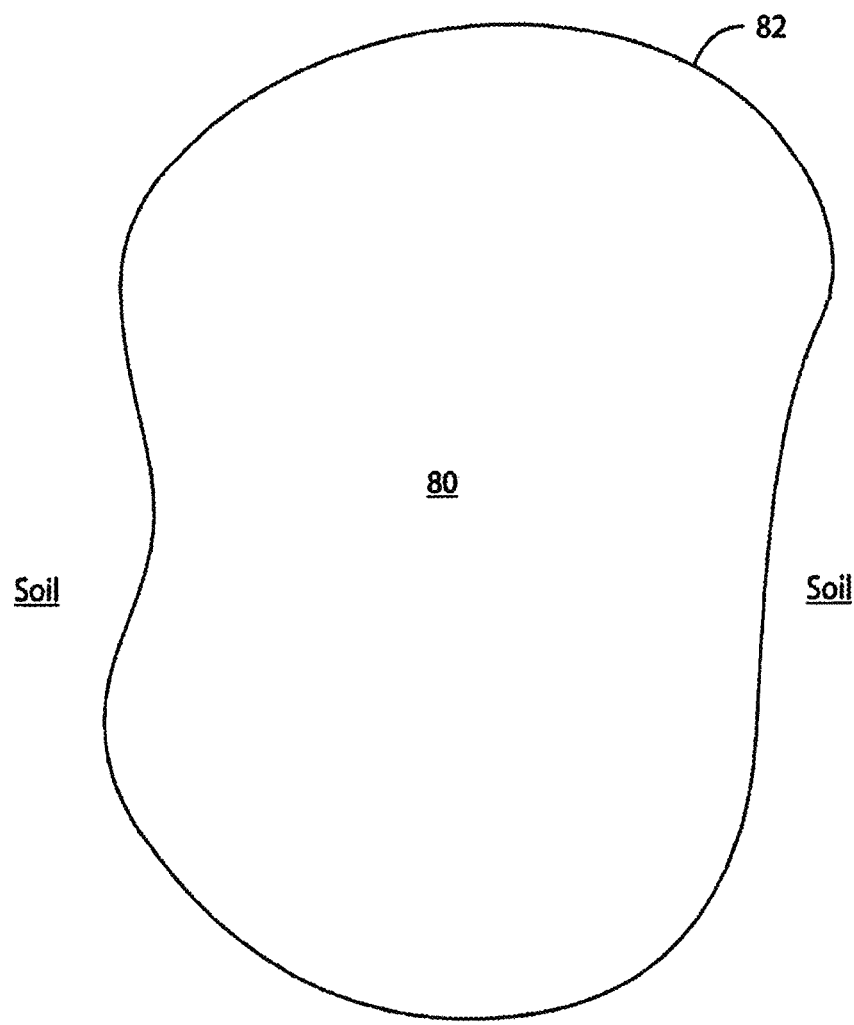
FIG. 8 illustrates a top view of an exemplary surface area that may be defined by the edging system of the present invention, in accordance with one embodiment of the invention.

It is further appreciated that the edging system of the present invention need not be inserted at the intersection of two surfaces (e.g., concrete and soil) but can be used as a stand-alone edging system to define a border of a desired artificial turf area. As shown in FIG. 8, in one embodiment, the edging system of the present invention can replace any type of border (e.g., bender board) used for landscaping purposes, to define an artificial turf area 80 having a desired perimeter 82 defined by the various embodiments of the edging system of the invention discussed above. The edging system can be inserted into an area of native soil that does not have an adjacent concrete surface, for example. Thus, the artificial turf area 80 is surrounded by the native soil which it is built upon.

As would be understood by those of ordinary skill in the art, the edging system can be made from any suitable materials with any desired dimensions to provide a desired flexibility and rigidity for a raised border that confines base material as discussed above and defines a desired perimeter 82 of the artificial turf area 80. As discussed above, the raised edge also simulates a raised cut edge of a real lawn and raises the height of the entire lawn itself, thereby improving the aesthetic appearance of the artificial turf area 80, as discussed above. Additionally, by providing a raised border, the invention reduces significant labor costs and time associated with excavating and removing soil to provide a containment area for base material, as was necessary in prior artificial turf systems and methods.

Figure 9A:
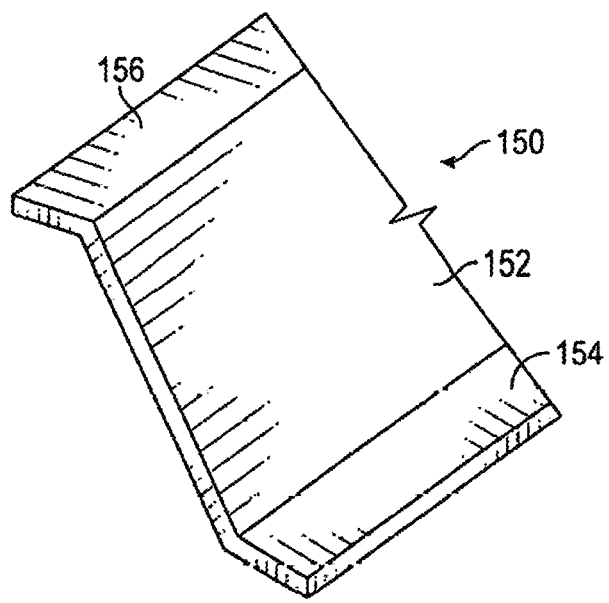
FIG. 9A illustrates a perspective view a raised border piece for providing a raised artificial turf edge, in accordance with some embodiments.

FIG. 9A illustrates a perspective view of an artificial turf raised border 150, in accordance with some embodiments. The artificial turf raised border 150 includes a main wall 152, a bottom flange 154 extending outwardly from a bottom portion of the main wall 152, and a top flange 156 extending outwardly from a top portion of the main wall 152. In some embodiments, the artificial turf raised border 150 is made from a thermoplastic resin such as polyvinyl chloride (PVC), polyethylene (PE), polystyrene (PS) or polypropylene (PP) materials, or any combination of two or more of these materials, and is extruded as a single integral piece to provide artificial turf raised border pieces 150 having a predetermined length (e.g., 20 feet).

Figure 9B:
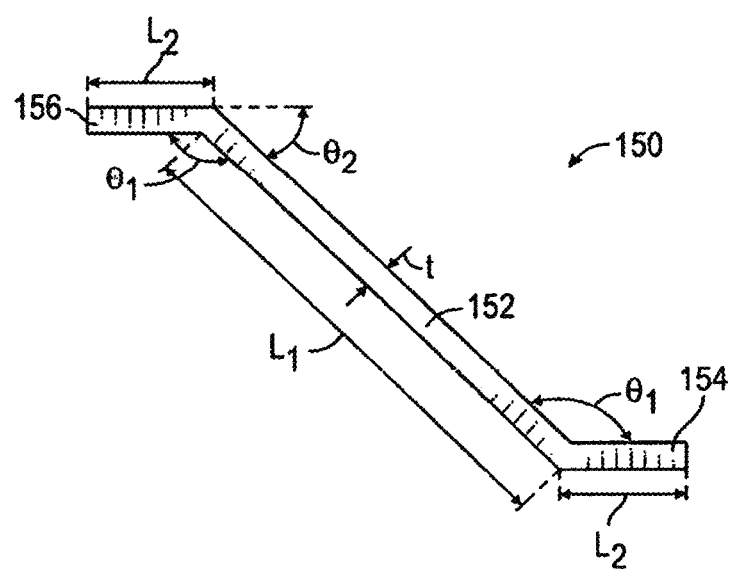
FIG. 9B illustrates a cross-sectional side view of the raised border piece of FIG. 9A.

FIG. 9B illustrates a cross-sectional, side view of the artificial turf raised border 150 of FIG. 9A. In accordance with various embodiments, the main wall 152 has a length (L1) in the range of 2.0 to 3.0 inches (e.g., 2.35 inches), and each of the bottom and top flanges 154 and 156, respectively, has a length (L2) in the range of 0.3 to 1.0 inches (e.g., 0.5 inches). In some embodiments, the main wall 152 and each of the bottom and top flanges 154 and 156 have the same thickness (t) in the range of 0.075 to 0.100 inches (e.g., 0.085 inches). In some embodiments, the bottom flange 154 extends outwardly from the bottom portion of the main wall 152 at a predetermined angle ($\theta_1$), and the top flange 156 extends outwardly from the top portion of the main wall 152 at the same predetermined angle ($\theta_1$). In some embodiments, the predetermined angle ($\theta_1$) is approximately 135 degrees such that a top surface of the main wall 152 is inclined at a second predetermined angle ($\theta_2$) of approximately 45 degrees with respect to a horizontal plane, as shown in FIG. 9B.

In some embodiments, the transition between main wall 152 and the top flange 156 can be a smooth continuous curve such that no defined angle exists where the top flange 156 meets the main wall 152. Similarly, in some embodiments, the transition between main wall 152 and the bottom flange 154 can be a smooth continuous curve such that no defined angle exists where the bottom flange 154 meets the main wall 152. In some embodiments, both transitions between the main wall 152 and the top flange 156 and the bottom flange 154, respectively, form a continuous curve such that the artificial turf raised border 150 has an "S" shape when viewed from a cross-sectional side view.

Figure 10:
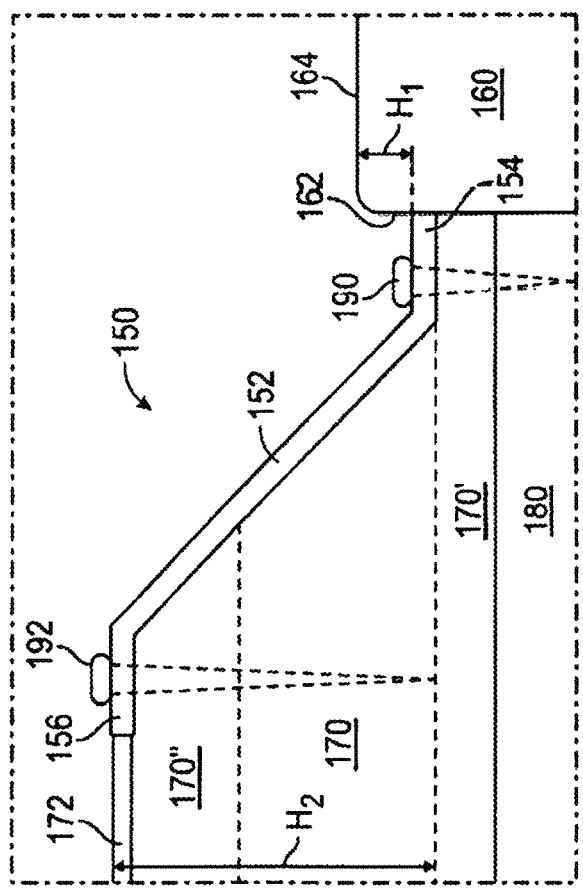
FIG. 10 illustrates a cross-sectional side view of the raised border pieces of FIGS. 9A and 9B after it is installed adjacent to an external concrete area and surface, in accordance with some embodiments.

FIG. 10 illustrates a cross-sectional, side view of the artificial turf raised border 150 after it is installed to abut a side surface 162 of a concrete area 160 that is adjacent to a native soil area 180, in accordance with some embodiments.

The artificial turf raised border 150 is placed above the native soil area 180 along a perimeter of the native soil area 180 that meets the concrete area 160. The concrete area 160 is referred to herein as an external area or surface adjacent to the artificial turf area having a perimeter defined by the raised border 150. As shown in FIG. 10, the artificial turf raised border 150 provides a main wall 152 that rises above the external top surface 164 of the adjacent concrete area 160, which is an example of an adjacent external area. The external top surface 164 is an example of an external surface adjacent to the raised border 150 and an internal artificial turf area having an outer perimeter defined by the raised border 150. The main wall 152 further extends away from the top surface 164 at a predetermined angle $\theta_1$ (FIG. 9B) or, alternatively, forms a predetermined angle $\theta_2$ (FIG. 9B) with respect to a horizontal plane above the main wall 152. In other words, it can be said that the main wall 152 extends upwardly and away from an adjacent external top surface 164 at an angle substantially equal to the first predetermined angle ($\theta_1$) since it can be presumed that the external top surface 164 is substantially parallel with at least a top surface of the bottom flange 156. In some embodiments, the first predetermined angle ($\theta_1$) is in the range of 100 to 170 degrees. In further embodiments, $\theta_1$ is in the range of 120 to 155 degrees. In further embodiments, $\theta_1$ is in the range of 130 to 140 degrees. As can be appreciated from FIG. 9B, $\theta_1 + \theta_2 = 180$ degrees. Thus, the higher the value of $\theta_1$ the lower the value of $\theta_2$.

The raised border 150 further confines a base material 170 within the perimeter of the artificial turf area upon which a manufactured artificial turf material will be placed and secured. In other words, the artificial turf raised border 150 surrounds at least a portion of a predetermined artificial turf area wherein the base material 170 is contained to support an artificial turf backing 30 (FIGS. 3A-3C) that is subsequently placed over the base material 170 and the raised border 150, as described in further detail below. In some embodiments, a first layer of base material 170' is poured over the native soil 180 at least along a strip adjacent the perimeter of the native soil 180 that meets the concrete area 160. This first layer of base material 170' is then compacted to provide a footing and foundation for the bottom flange 154 of the raised border 150 to sit on. After the first layer of base material 170' is compacted by either manual and/or mechanical compacting techniques the raised border 150 is placed over the first layer of base material 170' and secured to the base material layer 170' by hammering a plurality of nails 190 through spaced portions of the bottom flange 154 to secure the bottom flange 154 to the first base material layer 170' and possibly the underlying native soil 180. In some embodiments, the bottom flange 154 of each raised border piece 150 can have a plurality of holes pre-drilled at predetermined spacings (e.g., 4 to 6 inches apart) in order to facilitate hammering of the nails 190 through the bottom flange 154 and into the first layer of base material 170' and the native soil 180. Such predetermined holes may prevent or reduce undue stress and/or cracking of the bottom flange 154 during nailing.

In some embodiments, the level of the first layer of base material 170' is controlled to provide a desired height of a top surface of the bottom flange 154 with respect to the top surface of the adjacent concrete area 160. As shown in FIG. 10, the top surface of the bottom flange 154 is controlled to be a height ($H_1$) below the top surface 164 of the adjacent surface/area 160. In some embodiments, this height $H_1$ is one-quarter to two inches. In further embodiments, the height $H_1$ is one-half to one inch. The inventor has discovered that these value ranges for $H_1$ provide an optimal appearance when an artificial turf 30 is placed over the raised border 150 to abut the adjacent surface 160, as discussed in further detail below. It is understood that the concrete area 160 may be replaced by a native soil area, or an area of any desired material or composition.

After the bottom flange 154 is secured to the first layer of base material 170', a second layer of base material 170 is poured over the first layer of base material 170' to fill the remaining volume of space that will define the area for artificial turf placement and surrounded by the artificial turf raised border 150. The base material 170 is pushed against the back surface of main wall 152 of the raised border 150 to support the raised border 150 in a desired position. In some embodiments, an extra amount of base material 170 is compacted and pushed against the back surface of the raised border 150 to push its angle ($\theta_2$) with respect to the horizontal plane past its final desired resting angle (e.g., 45 degrees). Thereafter, the raised border is pounded with a mallet, for example, against the face of the raised border 150 to further compact the underlying base material 170 behind the main wall 152 and under the top flange 156. The force of the pushing or pounding corrects the angle $\theta_2$ to the desired angle of the main wall 152 (e.g., 45 degrees with respect to a horizontal plane).

In some embodiments, the first and second layers of base material 170' and 170 is a class 2 road base. In some embodiments after the second layer of base material 170 is provided and compacted as described above, a third layer of base material 170" is optionally poured over the second layer of base material 170. In some embodiments, the third layer of base material 170" is a finer base material (e.g., decomposed granite with a fine aggregate or sand) that is poured over the second layer of base material 170 at least along a strip immediately adjacent the top flange 156 of the raised border 150. Thereafter, compacted using known techniques is performed so that the level of a top surface of the third layer of base material 170" is substantially level with the top surface of the top flange 156. The third layer of base material 170" will fill any voids formed in the class 2 road base having larger aggregate pieces and thus provides a smooth transition point where the top flange 156 ends and the third layer of base material 170" begins. This avoids irregularities at the transition between the top flange 156 and the base material and provides a smoother surface upon which the artificial turf 30 can be placed. As shown in FIG. 10 the top levels of the second and third layers of base material are above the level of the top surface 164 of the adjacent area 160. As described above, since the raised border 150 rises above the level of an adjacent top surface 164, excavating the internal area surrounded by one or more raised border pieces to make room for the base material 170 is substantially reduced. Thus, the amount of time and labor previously required for such excavation, transport and dumping of the native soil is substantially reduced.

In some embodiments, in order to compact the first, second and third layers of the base material 170', 170 and 170", respectively, the base material is first watered down and thereafter manual compacting techniques and/or a mechanical plate compactor can be used, as is known in the art. After the raised border 150 is placed in its desired angle $\theta_2$ with respect to horizontal, as described above, a second set of nails 192 can be hammered or gunned through the top flange 156 to further secure the raised border 150 to the underlying base material 170. Thereafter, an optional weed fabric material 172 can be laid over the base material 170" but not over top flange 156 of the raised border 150, in accordance with some embodiments. This allows the top surface of the weed barrier 172 to be substantially flush with the top surface of the top flange 156 to provide a smooth top surface upon which an artificial turf backing can be placed.

In some embodiments, the raised border piece 150 can be secured to an adjacent border made of concrete, wood, or other suitable material instead of, or in addition to, being secured to the first layer of base material 170', as described above. For example, if there is a concrete, wood or plastic border adjacent to the perimeter of the artificial turf area 80 (FIG. 8), then the raised border piece 150 can be secured to such adjacent border such that the main wall 152 extends upwardly at a desired height and at a desired angle with respect to the adjacent border. In accordance with various embodiments, the raised border piece 150 can be secured to the adjacent border via nails, screws, staples and/or other known means in the field. Thus, in some embodiments, the first layer of base material 170' is not necessary if the raised border can be secured to an adjacent border.

Figure 11:
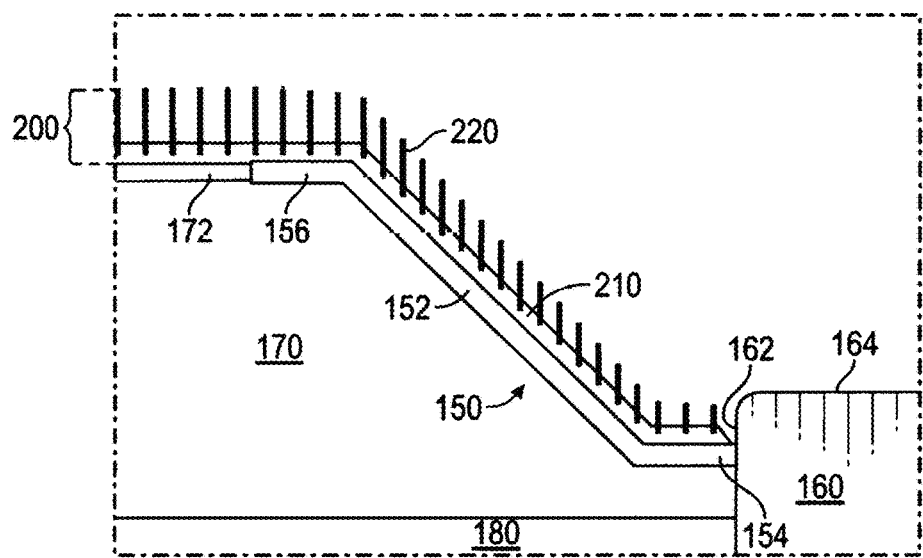
FIG. 11 illustrates a cross-sectional sideview of a raised border piece after it is installed adjacent to an external area and an artificial turf material is placed over and secured to the raised border piece, in accordance with some embodiments.

FIG. 11 shows a cross-sectional, side view of the artificial turf raised border 150 installed over native soil 180 next to a concrete surface 160 and confining compacted base material 170 behind the raised border 150. Artificial turf 200, having a backing material 210 and a plurality of artificial turf blades 220 extending upwardly from the backing 210, is placed and secured over the base material 170, optional weed barrier 172 and the raised border 150. As shown in FIG. 11, the artificial turf 200 extends over the top surface of the top flange 156, the main wall 152 and the bottom flange 154 such that an edge of the artificial turf 200 abuts the side surface 162 of the adjacent concrete area 160 or other type of area, in accordance with some embodiments. In accordance with various embodiments, the artificial turf 200 is secured to raised border piece 150 using nails, screws, staples, glue, Velcro, or any combination of these techniques or other know techniques. In some embodiments, the artificial turf 200 is nailed or screwed to the bottom flange 154 and/or near the portion where the bottom flange 154 meets the main wall 152 so as to firmly secure an edge of the artificial turf 200 to the edge of the raised border (i.e., the bottom flange 154) such that the artificial turf 200 cannot be pulled up. In some embodiments, the artificial turf blades 220 extending upwardly over the raised border 150 are trimmed (i.e., cut) such that their length tapers from shortest to longest as they extend from the bottom flange 154 over the main wall 152 and then over the top flange 156 until the length of the blades 220 transition into the full length of the manufactured turf product. The inventor has discovered that tapering the length of the artificial blades 220 in this fashion provides a more authentic and aesthetically pleasing appearance to the edge of the artificial turf 200. In some embodiments, the artificial turf blades 220 are trimmed or cut manually using scissors.

Figure 12:
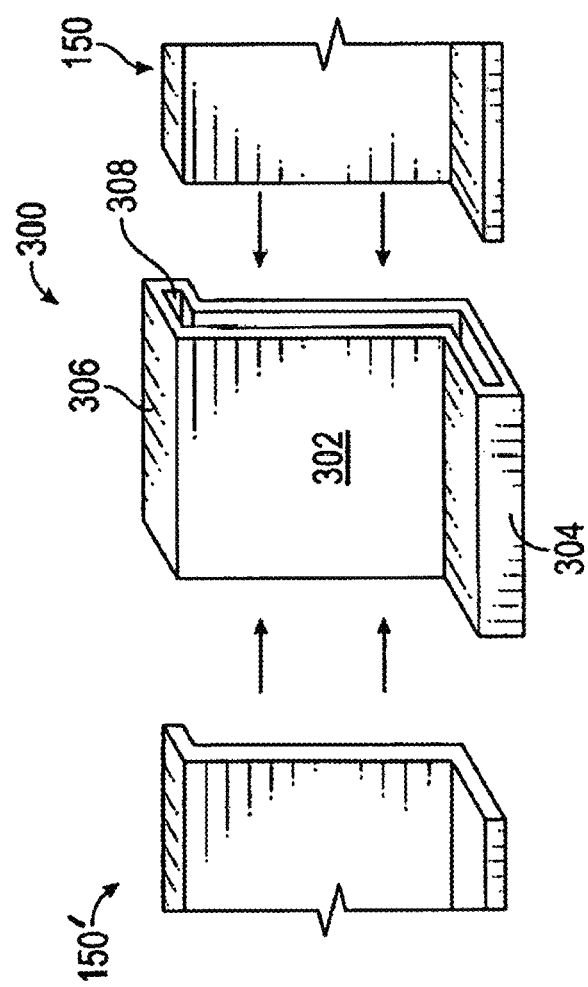
FIG. 12 illustrates a perspective view a coupling piece for coupling two raised border pieces to one another, in accordance with some embodiments.

As discussed above, each of the raised border pieces 150 can be extruded to provide a single integral piece have a predetermined linear length (e.g., 20 feet). If an area 80 (FIG. 8) over which artificial turf (AT) is to be laid is very large, multiple raised border pieces 150 may be required to surround and enclose the area 80. FIG. 12 illustrates a coupling piece 300 for coupling two raised border pieces 150 together, in accordance with some embodiments. In some embodiments, the coupling piece 300 mimics the shape of the raised border piece 150 and includes a main body 302, a bottom flange 304 and a top flange 306. However, the coupling piece 300 is slightly larger than the raised border piece 150 and further defines a form-fitting recess 308 that mimics the cross-sectional shape of the raised border piece 150, as shown in FIG. 9B, for example. The form-fitting recess 308 is configured to receive and hold an edge portion of the raised border 150 therein. A mirror copy (not shown) of the recess 308 is provided on the opposite side of the coupling piece 300 to similar receive a second border piece 150' therein. Thus, the coupling piece 300 can quickly and easily connect two raised border pieces 150, thereby reducing time and labor costs for large installation projects. In some embodiments, the coupling piece 300 is made from a thermoplastic resin such as polyvinyl chloride (PVC), polyethylene (PE), polystyrene (PS) or polypropylene (PP) materials, or any combination of two or more of these materials, and is extruded as a single integral piece.

Figure 13A:
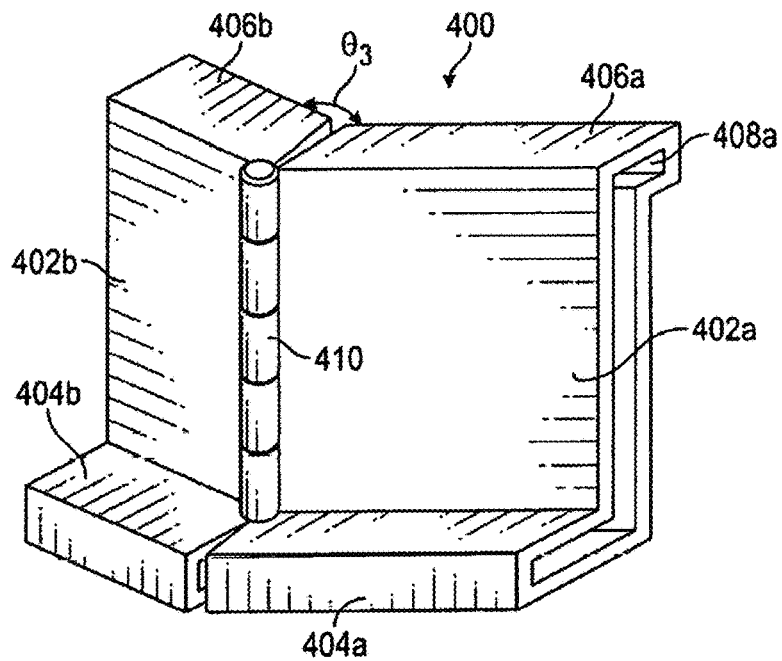
FIG. 13A illustrates a perspective view of an adjustable corner coupling piece, in accordance with some embodiments.

As shown in FIG. 8, the perimeter of an artificial turf area 80 can have many curves and/or angles of varying degrees. For such areas, it is desirable to have a mechanism for allowing the raised border pieces to curve or bend in different directions, especially at sharp corners of an artificial turf area. FIG. 13A illustrates a perspective view of an adjustable corner coupling piece 400 for coupling two raised border pieces 150 and 150' (FIG. 12) at an adjustable angle with respect to one another, in accordance with some embodiments of the invention. The adjustable corner coupling piece 400 includes a first half having a first main body 402a, a first bottom flange 404a, a first top flange 406a and a first form-fitting recess 408a. The adjustable corner coupling piece 400 further includes a second half having a second main body 402b, a second bottom flange 404b, a second top flange 406b and a second form-fitting recess 408b (not shown), which is a mirror-copy of the first form-fitting recess 408a. The first main body 402a is adjustably coupled to the second main body 402b with a hinge 410, in accordance with some embodiments of the invention. The hinge 410 allows a relative angle ($\theta_3$) between the first half and second half of the corner coupling piece 400 to be adjusted within a range of possible angles (e.g., 45 to 90 degrees). The form-fitting recesses 408a and 408b function in a similar manner as the form-fitting recess 308 described above with respect to FIG. 12. Accordingly, their function is not repeated here. Thus, the corner coupling piece 400 allows two raised border pieces 150 to be coupled to one another at a desired angle with respect to one another in a quick an easy manner, thereby saving time and labor costs associated with installing artificial turf. In some embodiments, the adjustable corner coupling piece 400 is made from any one or combination of known thermoplastic materials.

Figure 13B:
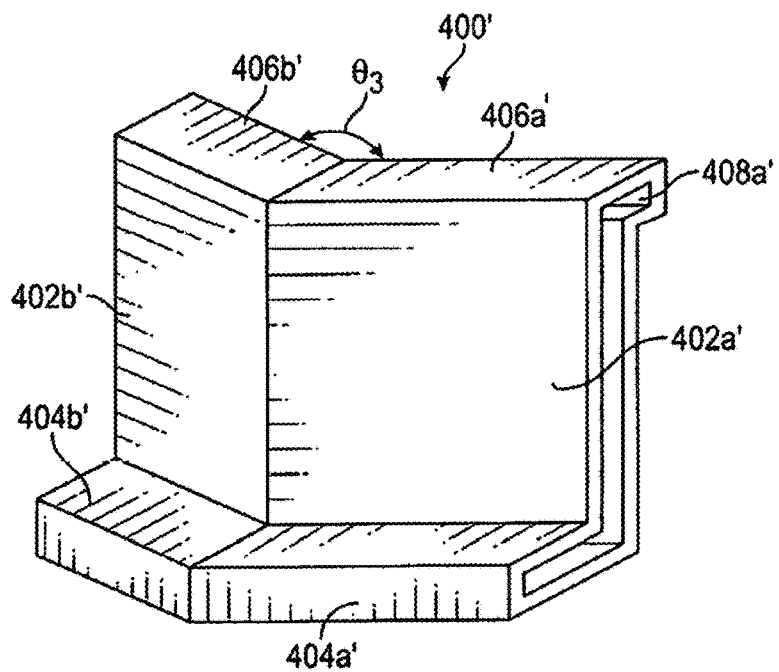
FIG. 13B illustrates a perspective view of a fixed corner coupling piece, in accordance with some embodiments.

FIG. 13B illustrates a perspective view of a fixed corner coupling piece 400' for coupling two raised border pieces 150 and 150' at a fixed predetermined angle with respect to one another. The fixed corner coupling piece 400' has includes a first half having a first main body 402a', a first bottom flange 404a', a first top flange 406a' and a first form-fitting recess 408a'. The fixed corner coupling piece 400' further includes a second half having a second main body 402b', a second bottom flange 404b', a second top flange 406b' and a second form-fitting recess 408b' (not shown), which is a mirror-copy of the first form-fitting recess 408a'. However, instead of using the hinge 410 of FIG. 13A, the first main body 402a' is directly attached to and fixed to the second main body 402b' such that the angle $\theta_3$ is fixed at a predetermined desired angle (e.g., 45, 60, 75 and 90 degrees). In some embodiments the first half and second half of the fixed corner coupling piece 400' are integrally formed with one another. In some embodiments, the fixed corner coupling piece 400' is made from any one or combination of known thermoplastic materials.

In accordance with some embodiments, the artificial turf edging system and methods disclosed herein can be utilized when there no pre-existing concrete, or other material, bordering the perimeter of the artificial turf area. FIG. 14 illustrates a perspective view of an artificial turf edging system that can be utilized in accordance with some embodiments. As shown in FIG. 14, a plurality of stakes 450 can be driven into the native soil 180 such that a top surface of the stakes 450 is substantially level or flush with the top surface of the native soil 180. In FIG. 14, the level of the top surface of the native soil 180 is indicated by dashed lines 182. In some embodiments, the stakes 450 are spaced at predetermined distances from one another along a predetermined perimeter of the artificial turf area 80. Thereafter, the bottom flange 154 of the raised border 150 is secured to each stake using a nail or screw 460, for example.

In some embodiments, a top surface of the head of each stake is pre-drilled with a hole 462 to receive a screw or nail therein. After the raised border 150 is secured to the native soil, one or more layers of base material 170 are poured into the area 80 behind the raised border 150 and thereafter compacted such that a top surface of the base material 170 is substantially level with a top surface of the top flange 156. In this way, a substantially planar surface that is slightly raised above the surrounding native soil 180 is provided upon which to install artificial turf. Additionally, the raised border 150 provides a smooth transition from the native soil 180 to the slightly raised surface that allows artificial turf edges to mimic the look of real lawn edges. Furthermore, as discussed above, the raised border 150 decreases the amount of native soil that must be removed to provide space where the base material must be poured and compacted to serve as a foundation for the artificial turf. As mentioned above, this decrease in the amount of native soil that must be excavated saves time and labor costs, and also decreases or eliminates costs associated with the removal, transport and dumping of the extra native soil.

Figure 15:
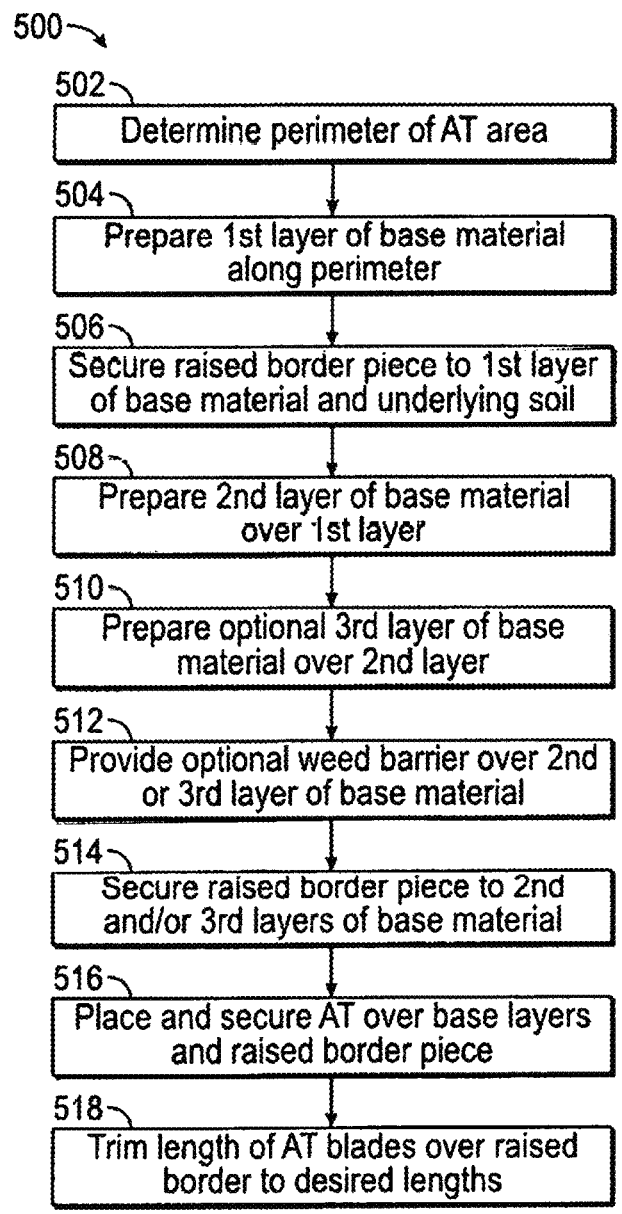
FIG. 15 illustrates a flow chart of a method of providing a raised artificial turf edge, in accordance with some embodiments.

FIG. 15 illustrates a flow chart of a method 500 of installing a raised border for an artificial turf (AT) area, in accordance with some embodiments of the invention. At operation 502, a perimeter of the AT area is determined and defined. In some embodiments, at least portions of the perimeter may be readily defined by an adjacent concrete, or other material, surface that meets the AT area at one or more sides of the AT area. In other embodiments, the perimeter can be determined and defined by spraying perimeter lines on the native soil or an existing grass area with paint. Alternatively, if there is an existing grass area, all or portions of the existing grass area can be removed to define the perimeter of the AT area. Next, at operation 504, a first layer of base material is prepared along an internal perimeter area of the AT area. In some embodiments, a relatively thin layer (e.g., one to three inches) of base material is poured along the inside perimeter of the AT area and thereafter compacted manually and/or by machine, using known compacting techniques. Next, at operation 506, a raised border piece is secured to the first layer of base material and underlying soil in order to keep the raised border in place.

Next, at operation 508, a second layer of base material is prepared over the first layer of base material. In some embodiments, preparing the second layer of base material involves pouring the second layer of base material to substantially fill the remaining portions of the AT area that is surrounding by the raised border pieces and thereafter compacting the second layer of base material such that a top surface of the second layer of base material is substantially level with or slightly lower than the top flange 156 of the raised border 150 (FIG. 10). If the top surface of the second layer of base material is slightly lower than the top flange 156, then at optional step 510, a third layer of base material is prepared over the second layer of base material. In some embodiments, this third layer of base material includes decomposed granite or sand with finer and smaller particle sizes than that of the second layer of base material. This allows the third layer of base material to provide a smoother top surface and transition from the base material to the top surface of the top flange 156 upon which to place and secure the artificial turf backing. In some embodiments, preparing the second and/or third layers of base material during operations 508 and 510 include compacting the base material behind raised border such that it pushes the raised border to an inclined position beyond its final desired resting angle $\theta_2$ from a horizontal plane (see FIG. 10). Thereafter, a mallet is used to pound the outer surface of the main wall 152 of the raised border 150 to further compact the base material behind the raised border and achieve the desired angle $\theta_2$ from the horizontal plane.

Next, at operation 512, an optional weed barrier is placed over the second or third layer of base material. At operation 514, the raised border piece is further secured to the second and/or third layers of the base material. In some embodiments, a second plurality of nails are driven through the top flange 156 and/or upper portions of the main wall 152 and into the second layer (and the optional third layer if present) of the base material. Next, at operation 516, manufactured artificial turf material is placed and secured over the base material layers, optional weed barrier layer and the top surface of the raised barrier such an edge of the artificial turf extends over a top surface of the bottom flange 154 of the raised border. In some embodiments, edge portions of the artificial turf are secured to portions of at least the bottom flange 154 of the raised border 150 by nails, screws, staples, or other known techniques. Finally, at operation 518, the AT blades extending over the raised border are trimmed to desired lengths. In some embodiments, the AT blades are cut such that their lengths transition from shorter to longer in a tapered fashion travelling from the bottom flange 154 over the main wall 152 to the top flange 156. This trimming of the AT blades further mimics the look of cut edge of a real lawn.

Figure 16A:
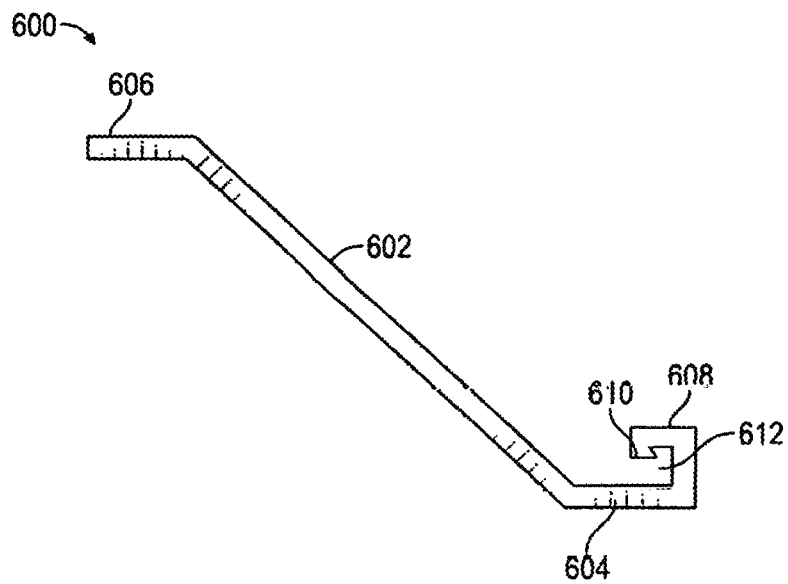
FIGS. 16A and 16B illustrates cross-sectional side views of raised border pieces, in accordance with some further embodiments.

FIG. 16A illustrates a cross-sectional side view of an artificial turf raise border 600, in accordance with a further embodiment of the invention. The raised border 600 is similar to the raised border 150 of FIGS. 9A and 9B and includes a main wall 602 similar to the main wall 152, a top flange 606 similar to the top flange 156 and a bottom flange 604 similar to the bottom flange 154. However, the raised border 600 further includes a lip portion 608 extending upwardly from the bottom flange 604 and thereafter curling inwardly toward the main wall 602. At the end of the lip portion 608 a barbed portion 610 is provided to engage and hold an end of an artificial turf backing material 30 that is slid into a channel 612 formed by the lip portion 608 and the barbed portion 610. Thus, the lip portion 608 and barbed portion 610 allow an installer to tuck a cut edge of artificial turf backing 30 into the channel 612 in a convenient and simple manner. Additionally, the barbed portion 610 ensures that the artificial turf backing 30 is securely held in place during further installation and securing steps (e.g., nailing) as described above. In some embodiments, the shape of the recesses 308, 408 and 408' of coupling pieces 300, 400 and 400' of FIGS. 12, 13A and 13B, respectively, are adjusted to match the cross-sectional side view of the raised border piece 600, as shown in FIG. 16A.

Figure 16B:
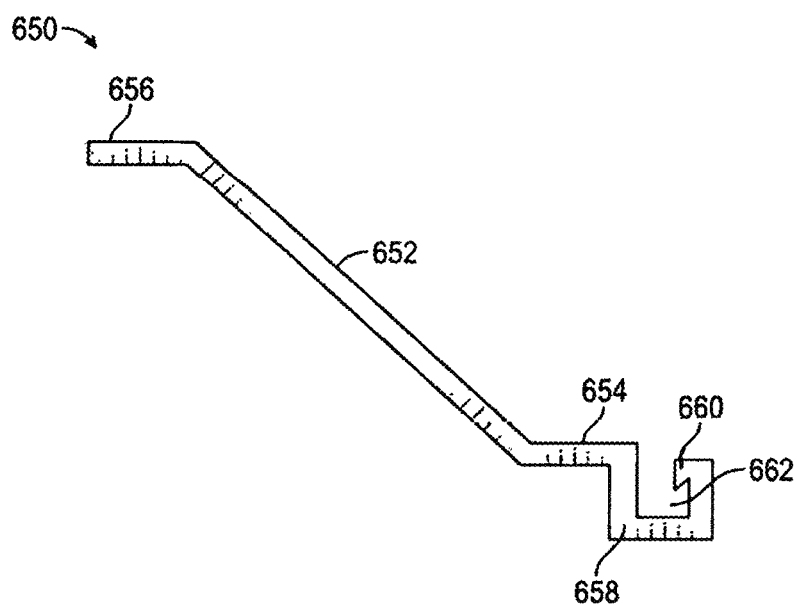

FIG. 16B illustrates a cross-section side view of an artificial turf raise border 650, in accordance with another embodiment of the invention. The raised border 650 is similar to the raised border 600 of FIG. 16A and includes a main wall 652 similar to the main wall 602, a top flange 656 similar to the top flange 606 and a bottom flange 654 similar to the bottom flange 604. However, the raised border 650 includes a lip portion 658 extending downwardly from the bottom flange 654 and thereafter curling upwardly. At the end of the lip portion 658 a barbed portion 660 is provided to engage and hold an end of an artificial turf backing material 30 that is slid into a channel 662 formed by the lip portion 658 and the barbed portion 660. The lip portion 658 and barbed portion 660 allow easy installation and securement of an artificial turf backing material 30 in a similar manner as described above with respect to the lip portion 608 and barbed portion 610. In some embodiments, the shape of the recesses 308, 408 and 408' of coupling pieces 300, 400 and 400' of FIGS. 12, 13A and 13B, respectively, are adjusted to match the cross-sectional side view of the raised border piece 650, as shown in FIG. 16B.

As discussed herein, the artificial turf edging system and method of the present invention provides a convenient and easy-to-install artificial turf raised border that eliminates or decreases the amount of dirt or soil that needs to be removed to allow for base material to be added and contained. This advantage alone saves considerable labor costs and reduces time of installation. Additionally, the edging system improves the aesthetic appearance of artificial turf by providing the appearance of a raised and cut edge of a real lawn, as well as elevating the overall height of the artificial turf, to further emulate the appearance of a real lawn.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A method of forming a raised, inclined edge for an artificial turf area, the method comprising: providing at least one raised border piece along a perimeter of the artificial turf area, wherein the at least one raised border piece includes a main wall configured to extend upwardly and away from an external top surface adjacent to the artificial turf area, wherein the main wall extends away from the external top surface at a first predetermined angle; providing at least one layer of base material in the artificial turf area to be confined by the at least one raised border; placing an artificial turf material over the at least one layer of base material and over the main surface of the at least one raised border piece; and securing the artificial turf material to the at least one layer of base material and the at least one raised border piece, wherein the artificial turf material comprises a plurality of artificial turf blades that extend outwardly and away from the main wall, and wherein a level of the at least one layer of base material confined behind the at least one raised border piece is higher than the external top surface.

2. The method of claim 1 wherein the at least one layer of base material comprises a first layer of base material and a second layer of base material, and the method further comprises: providing the first layer of base material along at least a peripheral area of the artificial turf area, wherein the at least one raised border piece is placed on top of and secured to the first layer of base material; and providing the second layer of base material over at least a portion of the first layer of base material and behind the main wall, wherein a level of the second layer of base material confined by the at least one raised border piece is higher than the external top surface.

3. The method of claim 2 further comprising providing a third layer of base material over at least a portion of the second layer of base material adjacent to the raised border piece, wherein the third layer of base material comprises a finer aggregate size than that of the second layer of base material.

4. The method of claim 2 wherein the raised border further comprises a bottom flange extending outwardly from the main wall at a second predetermined angle, and securing the at least one raised border piece to the at least one layer of base material comprises securing the bottom flange to the at least one layer of base material.

5. The method of claim 4 wherein securing the bottom flange to the at least one layer of base material comprises driving a plurality of nails through the bottom flange and into the at least one layer of the base material at predetermined spaced locations on the bottom flange.

6. The method of claim 5 further comprising pre-drilling a plurality of holes at the predetermined spaced locations on the bottom flange, wherein each of the plurality of holes are configured to allow a respective one of the plurality of nails to be driven therethrough.

7. The method of claim 4 wherein the first predetermined angle and the second predetermined angle are each in the range of 120 to 155 degrees.

8. The method of claim 1 wherein the first predetermined angle is in the range of 120 to 155 degrees.

9. The method of claim 1 further comprising cutting the plurality of artificial turf blades so they are shortest at a bottom portion of the at least one raised border piece and become longer toward a top portion of the at least one raised border piece in a tapered fashion.

10. A method of forming a raised, inclined edge for an artificial turf area, the method comprising: providing a first layer of base material within the artificial turf area; placing at least one raised border piece on top of the first layer of base material; securing the at least one raised border piece to the first layer of base material, wherein the at least one raised border piece includes a main wall that extends upwardly and away from an external top surface adjacent to the artificial turf area at a first predetermined angle; providing a second layer of base material over at least a portion of the first layer of base material; securing the at least one raised border piece to the second layer of base material; placing an artificial turf material over the second layer of base material and over the main surface of the at least one raised border piece; and securing the artificial turf material to the second layer of base material and the at least one raised border piece, wherein the artificial turf material comprises a plurality of artificial turf blades that extend outwardly and away from the main surface, and wherein a level of the second layer of base material confined behind the at least one raised border piece is higher than the external top surface.

11. The method of claim 10 further comprising providing a third layer of base material over at least a portion of the second layer of base material adjacent to the raised border piece, wherein the third layer of base material comprises a finer aggregate size than that of the second layer of base material.

12. The method of claim 10 wherein the raised border further comprises a bottom flange extending outwardly from the main wall at a second predetermined angle, and securing the at least one raised border piece to the first layer of base material comprises securing the bottom flange to the first layer of base material.

13. The method of claim 12 wherein securing the bottom flange to the at least one layer of base material comprises driving a plurality of nails through the bottom flange and into the at least one layer of the base material at predetermined spaced locations on the bottom flange.

14. The method of claim 13 further comprising pre-drilling a plurality of holes at the predetermined spaced locations on the bottom flange, wherein each of the plurality of holes are configured to allow a respective one of the plurality of nails to be driven therethrough.

15. The method of claim 10 further comprising cutting the plurality of artificial turf blades so they are shortest at a bottom portion of the at least one raised border piece and become longer toward a top portion of the at least one raised border piece in a tapered fashion.

* * * * *